US011199446B2

(12) United States Patent
Tisserand et al.

(10) Patent No.: US 11,199,446 B2
(45) Date of Patent: Dec. 14, 2021

(54) METHOD FOR LIMITING CROSSTALK IN AN IMAGE SENSOR (71) Applicant: SILIOS TECHNOLOGIES, Peynier (FR)

(72) Inventors: Stéphane Tisserand, Aubagne (FR); Laurent Roux, Marseilles (FR); Marc Hubert, Fuveau (FR); Vincent Sauget, Aix-en-Provence (FR); Aurélien Faiola, Marseilles (FR)

(73) Assignee: SILIOS TECHNOLOGIES, Peynier (FR)

( * ) Notice: Subject to any disclaimer, the term of this patent is extended or adjusted under 35 U.S.C. 154(b) by 406 days.

(21) Appl. No.: 16/305,673

(22) PCT Filed: May 30, 2017

(86) PCT No.: PCT/FR2017/000112
§ 371 (c)(1),
(2) Date: Nov. 29, 2018

(87) PCT Pub. No.: WO2017/207881
PCT Pub. Date: Dec. 7, 2017

(65) Prior Publication Data
US 2020/0326235 A1 Oct. 15, 2020

(30) Foreign Application Priority Data
May 30, 2016 (FR) ..................................... 16/00872
Jun. 13, 2016 (FR) ..................................... 16/00947

(51) Int. Cl.
G01J 3/02 (2006.01)
G01J 3/26 (2006.01)
(Continued)

(52) U.S. Cl.
CPC ............... G01J 3/027 (2013.01); G01J 3/26 (2013.01); H04N 5/359 (2013.01); H04N 9/735 (2013.01);
(Continued)

(58) Field of Classification Search
CPC ...... G01J 3/027; G01J 3/26; G01J 2003/2826; G01J 3/513; G01J 3/28; H04N 5/359; H04N 9/735; H04N 17/002
See application file for complete search history.

(56) References Cited

U.S. PATENT DOCUMENTS

2003/0156214 A1* 8/2003 Guimaraes ............... H04N 9/11
348/342
2011/0031418 A1* 2/2011 Shcherback .......... G01J 1/0425
250/559.29
(Continued)

FOREIGN PATENT DOCUMENTS

FR 2904432 A1 2/2008
JP 2011-223452 A 11/2011
WO 2009142641 A1 11/2009

OTHER PUBLICATIONS

International Search Report for PCT/FR2017/000112 dated Oct. 9, 2017 [PCT/ISA/210].

Primary Examiner — Michael E Teitelbaum
(74) Attorney, Agent, or Firm — Sughrue Mion, PLLC (57) ABSTRACT A method of limiting cross-talk in an imaging sensor, the sensor being in the form of a matrix of macropixels defining an image, each macropixel being formed by a matrix of individual pixels, each of which is dedicated to a distinct spectral band, all of the individual pixels dedicated to the same spectral band forming a sub-image, the image being topologically subdivided into at least one parcel, and the method including the following steps: measuring the spectral response of each individual pixel $\lambda 1, \lambda 2, \lambda 3, \ldots, \lambda 9$;
(Continued)

calculating the mean spectral response of each sub-image in a parcel; targeting to define the ideal response of each sub-image in the parcel; estimating a series of coefficients for minimizing cross-talk in the parcel; and applying the coefficients to the macropixels in order to correct the sub-images in the parcel. The method is remarkable in that the ideal response is a Gaussian function.

7 Claims, 5 Drawing Sheets

(51) Int. Cl.
　　*H04N 5/359*　　　(2011.01)
　　*H04N 9/73*　　　　(2006.01)
　　*H04N 17/00*　　　(2006.01)
　　*G01J 3/28*　　　　(2006.01)

(52) U.S. Cl.
　　CPC .... *H04N 17/002* (2013.01); *G01J 2003/2826* (2013.01)

(56) References Cited

U.S. PATENT DOCUMENTS

| | | | |
|---|---|---|---|
| 2012/0262544 A1* | 10/2012 | Damera-Venkata | ............ H04N 13/337 348/43 |
| 2012/0274786 A1 | 11/2012 | Wang | |
| 2014/0193050 A1 | 7/2014 | Miller | |

* cited by examiner

METHOD FOR LIMITING CROSSTALK IN AN IMAGE SENSOR

CROSS REFERENCE TO RELATED APPLICATIONS

This application is a National Stage of International Application No. PCT/FR2017/000112, filed on May 30, 2017, which claims priority from French Patent Application No. 16/00872, filed on May 30, 2016, and French Patent Application No. 16/00947, filed on Jun. 13, 2016.

The present invention relates to a method of limiting cross-talk in an image sensor.

Various technologies serve to analyze an object with satisfactory spectral resolution when it is desired to have a spectrum that is continuous.

These technologies are also well adapted to circumstances in which a finite number of passbands that are relatively narrow (i.e. a spectrum that is discrete as compared with a spectrum that is continuous) suffices to identify the looked-for components.

Nevertheless, these technologies consider the object that is to be analyzed as an indissociable entity, i.e. an entity that is not resolved in three dimensions, and they are not suitable for identifying variations in optical transmission or reflection specifically within a single object.

Thus, Document FR 2 904 432 teaches an optical filter matrix structure and an associated image sensor. The idea is to be able to capture different colors. Specifically, starting from three fundamental colors taken in the visible spectrum (red, green, blue), it is possible to reconstitute most colors.

Specifically, use is made of a matrix of filters arranged at the surface of a matrix of detectors. The matrix of filters is a so-called "Bayer" matrix, but that is of little importance to the present invention. The matrix of detectors is a so-called active pixel sensor complementary metal oxide semiconductor (APS CMOS) matrix. The matrix is implemented on a semiconductor substrate on the surface of which there are arranged photosensitive zones, electronic circuits, and electrical connections.

For an individual pixel, the photosensitive zone represents only a fraction of the total area, the remainder of the area being occupied by control electronics. It is therefore necessary to provide microlenses, one per pixel, in order to focus the incident light on the photosensitive zone of the pixel. The matrix of filters is arranged in contact with the detector so that the resulting assembly is presented as a single component constituted by a detector-filter-microlens stack.

Specifically, it is not possible to envisage depositing the matrix of filters on the microlenses since the microlenses have topology that is very marked. Furthermore, the microlenses are made of resin, so that it would appear to be difficult to make an inorganic filter on an organic material.

Unfortunately, the angular aperture of the beam incident on the filters is large when the filters are arranged under the microlenses. The response of the filters is very closely associated with this angle of incidence. That gives rise to a modification to the spectral response.

In order to avoid that problem of angle of incidence on the filters, it is possible to envisage eliminating the microlenses. Nevertheless, the photosensitive zone presents an area that is smaller than the total area of the pixel. A microlens delivers an increase in sensitivity of about 50%. It therefore appears to be inappropriate to lose sensitivity by eliminating the microlenses.

It should also be mentioned that the fabrication yield of such a component is relatively low. The overall yield is substantially equal to the product of the following three yields:
fabrication of the detector;
fabrication of the filter matrix; and
fabrication of the array of microlenses.

As a result, by increasing the number of fabrication operations, the overall yield is significantly reduced.

A multispectral imaging sensor is thus made available that does not present the above-mentioned limitations.

That sensor is described with reference to the accompanying figures, in which:

FIG. 1 is a theoretical diagram of a one-dimensional filter cell, comprising more particularly.

Elements present in more than one of the figures are given the same references in each of them.

The description begins with a filter module that has a plurality of filter cells that are generally identical.

Figure 1A:
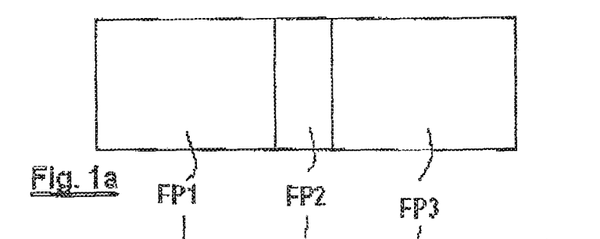
FIG. 1a, a plan view of the cell.
Figure 1B:
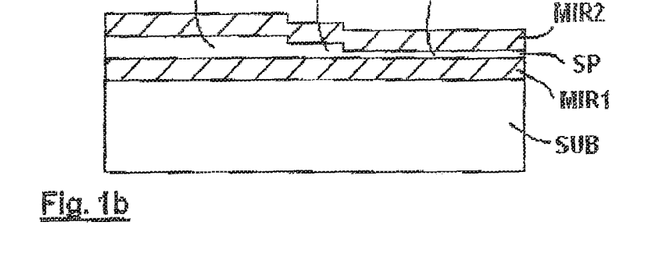
FIG. 1b, a section view of the cell.

With reference to FIGS. 1a and 1b, a filter cell comprises three Fabry-Perot type interference filters FP1, FP2, and FP3 aligned in succession so as to form a strip.

The cell is constituted by stacking the following on a substrate SUB, e.g. made of glass or of silica: a first mirror M1; a spacer membrane SP; and a second mirror MIR2.

The spacer membrane SP defines the sensor wavelength of each filter and is therefore constant for a given filter but varies from one filter to another. Its profile is staircase-shaped since each filter presents a surface that is substantially rectangular.

A first method of making the filter module by thin film technology is given by way of example.

Figure 2A:
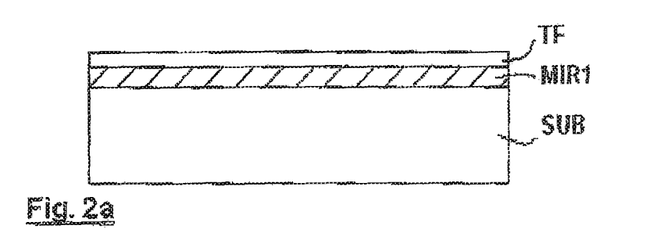
FIGS. 2a to 2c show three steps of a first implementation for making a filter module.

With reference to FIG. 2a, the method begins by depositing on the substrate SUB the first mirror MIR1, followed by a dielectric layer or a set of dielectric layers TF that is to define the spacing membrane SP. The mirror may be metallic or dielectric.

Figure 2B:
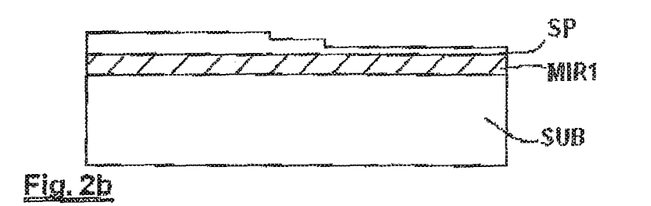

With reference to FIG. 2b, the dielectric TF is etched:
firstly in the second and third filters FP2 and FP3 in order to define the thickness of the spacing membrane SP for the second filter FP2; and
secondly in the third filter FP3 in order to define the thickness level of the membrane in that filter.

The spacing membrane SP in the first filter FP1 has the thickness of the deposit.

Figure 2C:
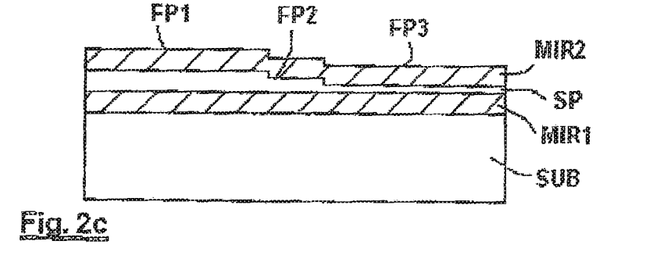

With reference to FIG. 2c, the second mirror MIR2 is deposited on the spacer membrane SP in order to finish off all three filters.

The spacer membrane SP may be obtained by depositing a dielectric TF followed by successive etching operations as described above, however it could also be obtained by depositing a plurality of thin layers in succession.

By way of example, it is possible to cover the wavelength range 800 nanometers (nm) to 1000 nm by modifying the optical thickness of the spacer membrane from $1.4\lambda_0/2$ to $2.6\lambda_0/2$ (where $\lambda_0=900$ nm and n=1.45 while e lies in the range 217 nm to 403 nm).

It should be observed at this point that the thickness of the spacer membrane needs to be thin enough to obtain only one transmission band in the range that is to be probed. Specifically, the more this thickness is increased, the greater the number of wavelengths that satisfy the condition [ne=k$\lambda$/2].

A second method of making a filter module is described below.

Figure 3A:
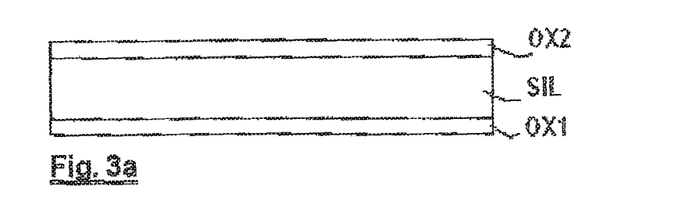
FIGS. 3a to 3f show six steps of a second implementation for making the filter module.

With reference to FIG. 3a, the method begins by performing thermal oxidation on the bottom face OX1 and the top face OX2 of a silicon substrate SIL.

Figure 3B:
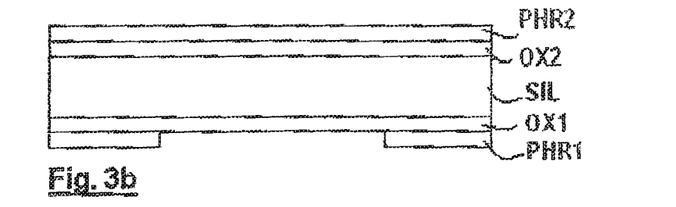

With reference to FIG. 3b, the bottom and top faces OX1 and OX2 of the substrate are covered respectively in a bottom layer PHR1 and a top layer PHR2 of photosensitive resin. Thereafter, a rectangular opening is formed in the bottom PHR1 by photolithography.

Figure 3C:
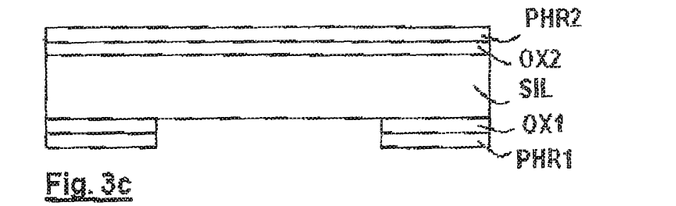

With reference to FIG. 3c, the thermal oxide of the bottom face OX1 is etched in register with the rectangular opening formed in the bottom layer PHR1. The bottom and top layers PHR1 and PHR2 are then removed.

Figure 3D:
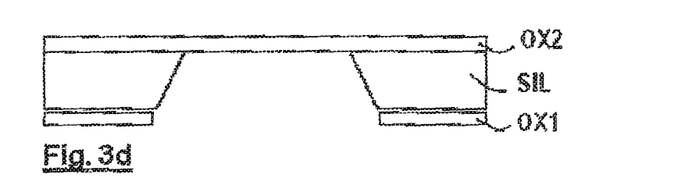

With reference to FIG. 3d, anisotropic etching is performed on the substrate SIL (e.g. crystallographic orientation 1-0-0) in register with the rectangular opening, the thermal oxide on the bottom face OX1 serving as a mask and the thermal oxide on the top face OX2 serving as an etching stop layer. The etching may either be wet etching using a solution of potassium hydroxide (KOH) or of trimethyl ammonium hydroxyl (TMAH), or else dry etching with a plasma. As a result of this operation, there remains only an oxide membrane at the far end of the rectangular opening.

Figure 3E:
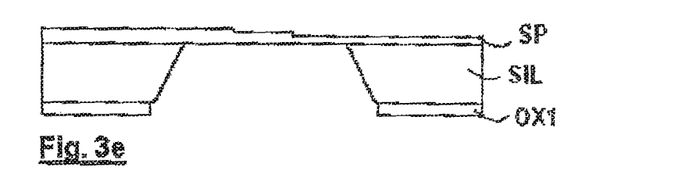

With reference to FIG. 3e, this oxide is etched:
initially in the second and third filters FP2 and FP3 in order to define the thickness of the spacer membrane SP in the second filter FP2; and
thereafter in the third filter FP3 in order to define the thickness of the membrane SP for this filter.

Figure 3F:
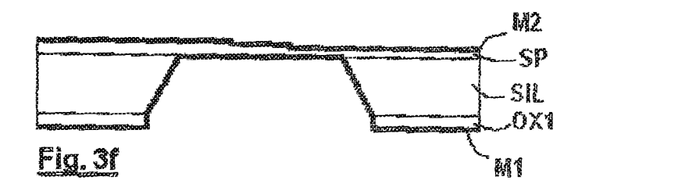

With reference to FIG. 3f, the first and second mirrors M1 and M2 are deposited on the bottom and top faces OX1 and OX2 of the substrate SIL.

Making of the filter module may optionally be terminated by depositing a passivation layer (not shown) on one and/or the other of the bottom and top faces OX1 and OX2.

It is thus possible to make a set of filters in alignment, the filters thus being capable of being referenced in a space of one dimension.

Figure 4:
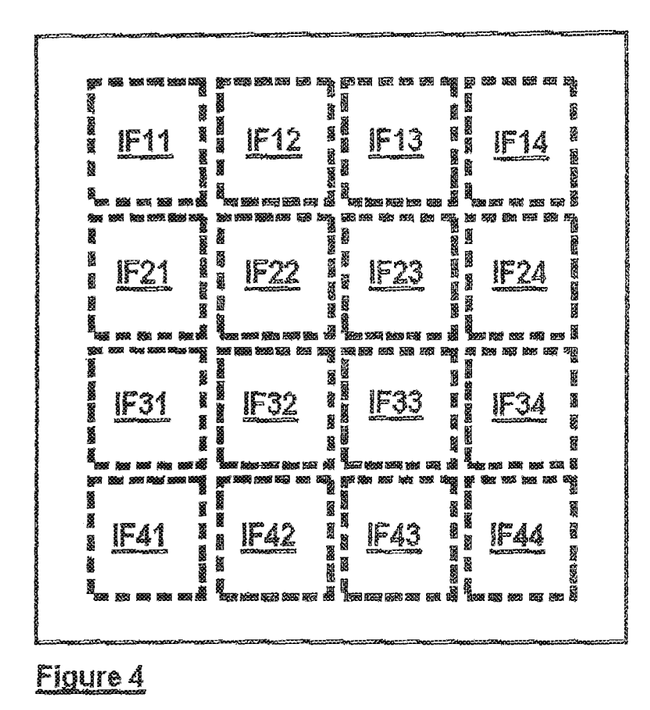
FIG. 4 is a diagram of a two-dimensional filter module.

With reference to FIG. 4, it is also possible to organize the filter cells in a space of two dimensions. Such an organization is often referred to as a matrix.

Each of four identical horizontal strips comprises four cells that are now considered as macropixels. The first strip, i.e. the strip that appears at the top of the figure, corresponds to the first row of a matrix and comprises the macropixels IF11 to IF14. The second, third, and fourth strips respectively comprise the macropixels IF21 to IF24, the macropixels IF31 to IF34, and the macropixels IF41 to IF44.

The organization is said to be in the form of a matrix since macropixel IFjk belongs to the j$^{th}$ horizontal strip and also to a k$^{th}$ vertical strip, which is made up of the macropixels IF1k, IF2k, . . . , IF4k.

Figure 5:
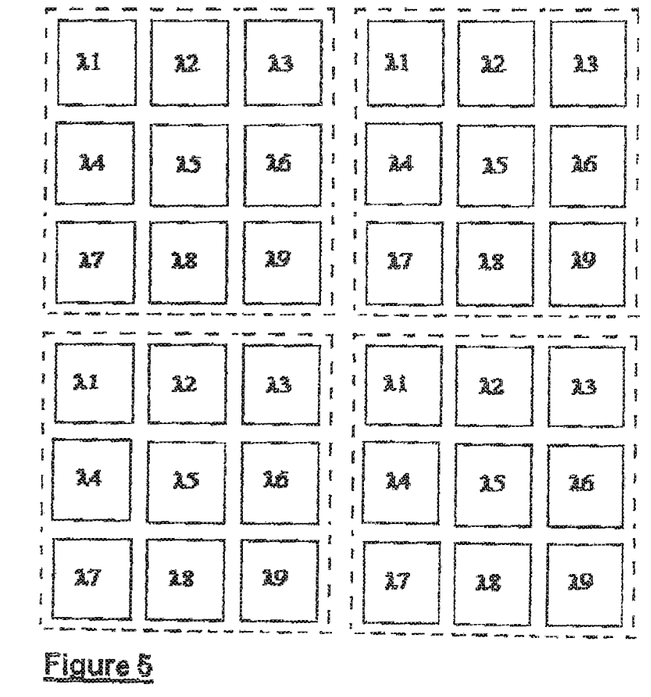
FIG. 5 is a diagram of a filter module in which each of the cells includes nine filters.

With reference to FIG. 5, each macropixel now has nine filters that define individual pixels. Each of these macropixels is in the form of a square in which there is inscribed a respective one of the filters tuned to distinct wavelengths $\lambda$1, $\lambda$2, $\lambda$3, $\lambda$4, . . . , $\lambda$9. The set of individual pixels tuned to the same wavelength form a sub-image.

In this figure, for reasons of clarity, the spacing between macropixels is deliberately exaggerated compared with the spacing between two individual pixels. In reality, these spacings are naturally identical.

The filter module is thus associated with a detector suitable for detecting the light fluxes produced by the various filters. The detector is thus made up of a plurality of compartments.

Figure 6:
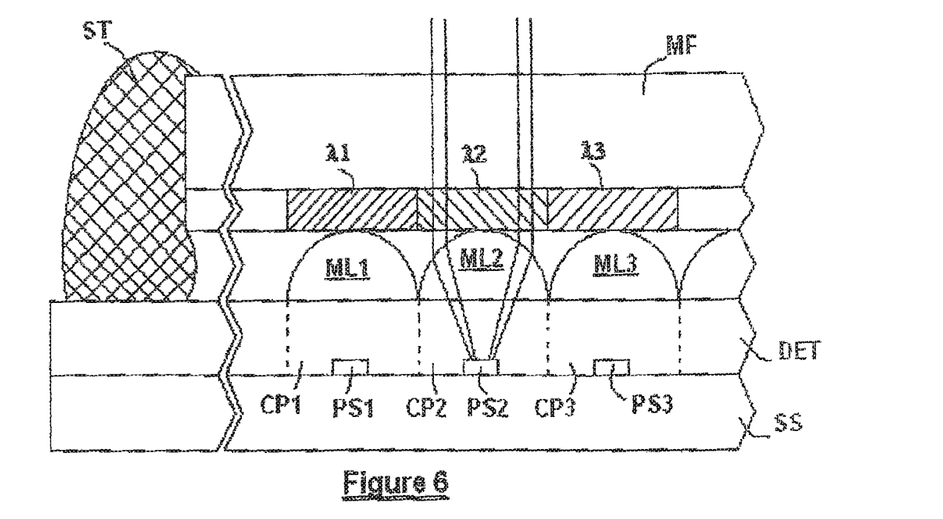
FIG. 6 is a section view of the proposed sensor.

With reference to FIG. 6, there can be seen the filter module MF as shown in FIG. 5.

The detector DET is made of CMOS technology on a silicon substrate SS. At the center of each compartment CP1, CP2, CP3 of square shape there is a photosensitive zone PS1, PS2, PS3.

Above each compartment CP1, CP2, CP3 there is a microlens ML1, ML2, ML3 of diameter equal to the side of the compartment.

The filter module MF bears on the array of microlenses ML1, ML2, ML3 so that the filters $\lambda$1, $\lambda$2, $\lambda$3 are in register with the microlenses ML1, ML2, ML3.

This positioning of the module MF is performed by means of alignment patterns, a technique that is known to the person skilled in the art of photolithography, and that is therefore not described in greater detail.

The filter module MF is fastened on the detector DET by means of a bead of adhesive ST.

To clarify ideas, it is specified that the size of the pixels is commonly about 5 micrometers.

The above-described multispectral imaging sensor is satisfactory concerning most of its characteristics. Nevertheless, it has been found, surprisingly, that that sensor suffers from cross-talk between an individual pixel and its closest neighbors.

Thus, Document US 2012/274786 proposes a method of limiting cross-talk in an imaging sensor, the sensor being in the form of a matrix of macropixels defining an image, each macropixel being formed by a matrix of individual pixels, each of which is dedicated to a distinct spectral band, all of the individual pixels dedicated to the same spectral band forming a sub-image, the image being topologically subdivided into at least one parcel, and the method comprising the following steps:
measuring the spectral response of each individual pixel;
calculating the mean spectral response of each sub-image in a parcel;
targeting to define the ideal response of each sub-image in the parcel;
estimating a series of coefficients for minimizing cross-talk in the parcel; and
applying the coefficients to the macropixels in order to correct the sub-images in the parcel.

An object of the present invention is thus to limit cross-talk in any multi-spectral imaging sensor, and more particularly in a sensor as described above.

The invention provides a method of limiting cross-talk in an imaging sensor, the sensor being in the form of a matrix of macropixels defining an image, each macropixel being formed by a matrix of individual pixels, each of which is dedicated to a distinct spectral band, all of the individual pixels dedicated to the same spectral band forming a sub-image, the image being topologically subdivided into at least one parcel, and the method comprising the following steps:
measuring the spectral response of each individual pixel;
calculating the mean spectral response of each sub-image in a parcel;
targeting to define the ideal response of each sub-image in the parcel;
estimating a series of coefficients for minimizing cross-talk in the parcel; and applying the coefficients to the macropixels in order to correct the sub-images in the parcel;

the method being remarkable in that said ideal response is a Gaussian function.

This significantly reduces cross-talk in the imaging sensor.

In a first arrangement, there are a plurality of parcels and the parcels coincide with the macropixels.

In a second arrangement, there are a plurality of parcels and each of the parcels comprises a plurality of contiguous macropixels.

In a third arrangement, there is a single parcel and the parcel coincides with the image.

In a preferred implementation, the estimation step comprises an optimization stage for producing the series of coefficients so as to minimize the difference between the responses of the sub-images corrected by these coefficients and the ideal responses of these sub-images.

Preferably, the optimization stage makes use of the generalized reduced gradient method.

In a first option, each individual pixel is processed with reference to the other individual pixels of the same macropixel.

This first option has the merit of simplicity.

In a second option, each individual pixel is processed with reference to the other individual pixels that are its closest neighbors.

This second option presents the advantage of greater accuracy.

The present invention is described below in greater detail in the context of the following description of implementations given by way of illustration and with reference to the following accompanying figures, in which:

By assumption, the image is thus formed by all of the macropixels of the imaging sensor.

The image may then be subdivided topologically into parcels.

A parcel for which the topological unit is a macropixel can thus comprise from one to all of the macropixels, with the limiting situation being a single parcel that coincides with the image.

It is this particularly advantageous limiting situation that is addressed below.

Returning to the matrix configuration described with reference to FIG. 5, there is a macropixel made up of nine individual pixels.

Figure 7:
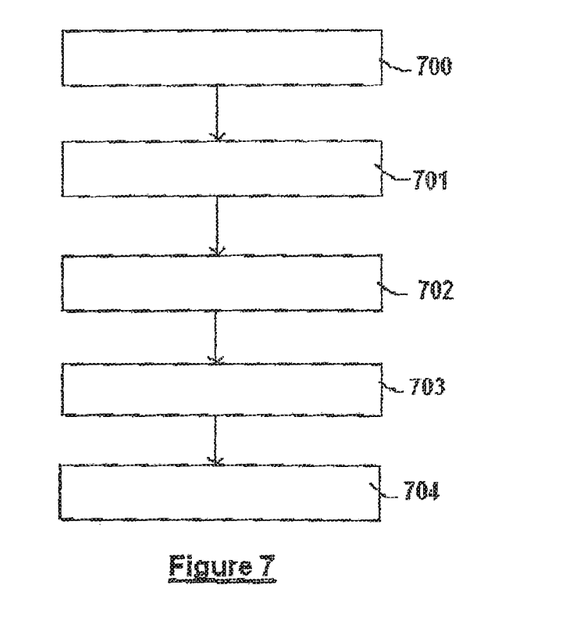
FIG. 7 is a flow chart of the method of the invention.

With reference to FIG. 7, the first step of the method of the invention is a characterizing step 700 for characterizing each individual pixel. To do this, a monochromator is used, e.g. covering the range 400 nm to 1000 nm with a step size of 2 nm. This serves to obtain the respective spectral responses of all of the individual pixels.

Thereafter, there is an averaging step 701 for calculating the average spectral response of each sub-image while considering the pertinent individual pixels. By way of example, among the nine sub-images, eight are tuned to distinct spectral bands, while the last sub-image is panchromatic. This provides a reference.

The following step is a targeting step 702 for determining the ideal spectral response of each sub-image. In the present example, a Gaussian function is selected for each of them, by specifying a center wavelength and a half-height width. The panchromatic sub-image is not corrected.

The following step is an estimation step 703 for obtaining a tensor of 9×9 coefficients that is to come as close as possible to the ideal responses when applied to the average spectral responses. In the present example, this estimation is performed using the so-called generalized reduced gradient method. Hover, the person skilled in the art knows numerous other methods that could be used, and in particular:
the Monte-Carlo method;
the simplex method;
the least squares method;
the Nelder-Mead method;
the Newton-Raphson method;
the quasi-Newton method;
the non-linear least squares method;
the Levenberg-Marquart method;
the genetic algorithm method.

Finally, in a correction step 704, the tensor is applied to the raw image in order to obtain the cross-talk corrected image.

There follows a detailed description of the estimation step while using the following notations:

Fr ($\lambda$): light flux;

$QE_i(\lambda)$: quantum efficiency of an individual pixel provided with a filter $\lambda i$;

$QEr_i(\lambda)$: quantum efficiency of a virtual individual pixel after cross-talk processing;

$P_i$: response of an individual pixel associated with the $\lambda i$ filter;

$Pr_i$: response of a virtual individual pixel after processing;

$CC_{ij}$: cross-talk coefficients of the sensor.

The following assumptions are made:
the light flux is uniform over a macropixel;
noise is negligible;
the response of individual pixels is linear (no saturation or "antiblooming", gamma, etc. correction); and
the response of the filters is linear and depends only on wavelength.

The following are then defined:

$$QEr_i(\lambda) = \sum_j CC_{ij} \times QE_j(\lambda) \quad (1)$$

The response of an individual pixel is as follows:

$$P_i = \int_\lambda Fr(\lambda) \times QE_i(\lambda) d\lambda \quad (2)$$

The response of a virtual pixel is as follows:

$$Pr_i = \int_\lambda Fr(\lambda) \times QEr_i(\lambda) d\lambda \quad (3)$$

Substituting equation (1) into equation (3):

$$Pr_i = \int_\lambda Fr(\lambda) \times \left( \sum_j CC_{1j} \times QE_j(\lambda) \right) d\lambda \quad (4)$$

The coefficients $CC_{ij}$ are independent of $\lambda$, thus:

$$Pr_i = \sum_j \left( CC_{1j} \int_\lambda Fr(\lambda) \times QE_j(\lambda) d\lambda \right) \quad (5)$$

Substituting equation (2) into equation (5):

$$Pr_i = \sum_j C_{ij} \times P_j$$

This serves to obtain the values of the corrected individual pixels $Pr_i$ as a function of the values of the raw individual pixels $P_j$.

By proceeding as above, an individual pixel is corrected as a function of all of the individual pixels in a given macropixel. This solution has the merit of simplicity and it relies on the fact that there is little variation in luminosity between two adjacent macropixels.

Figure 8:
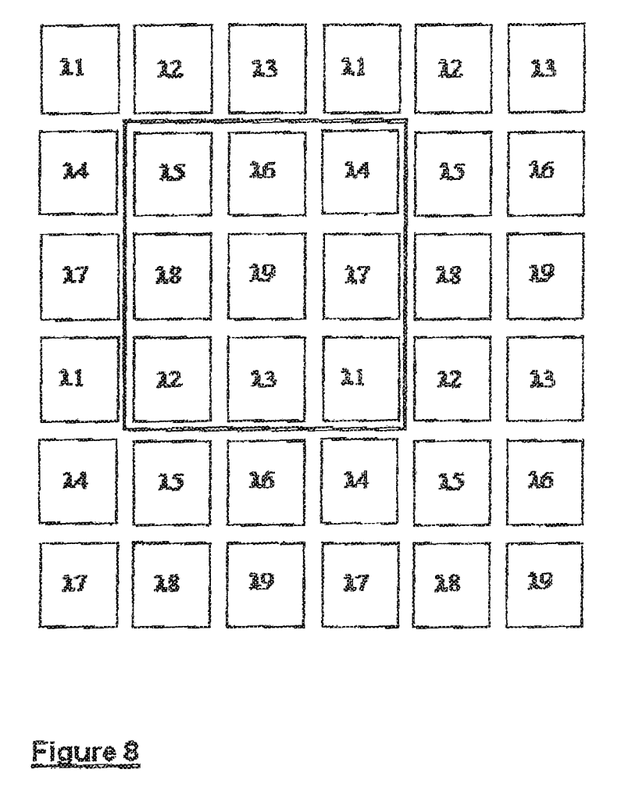
FIG. 8 is a diagram showing the neighbors closest to a determined individual pixel.

With reference to FIG. 8, when correcting an individual pixel the quality of the correction can be improved by taking into consideration, no longer the individual pixels of the same macropixel, but rather the individual pixels that are the nearest neighbors to the pixel that is to be corrected. This method is to be preferred more particularly when three-dimensional de-mosaicing processing is also applied, as is well known to the person skilled in the art.

By way of example, in order to correct the individual pixel λ9 of the macropixel that appears top left, consideration is given to the following individual pixels:

λ5, λ6, λ8 of the top left macropixel;
λ4, λ7 of the top right macropixel;
λ1 of the bottom right macropixel; and
λ2, λ3 of the bottom left macropixel.

The correction method is then analogous to that described above. It is therefore not described in detail since it comes within the competence of the person skilled in the art.

The arrangement described above has only one parcel, with the image being processed globally. The main advantage of that arrangement lies in the fact that there is only one tensor to calculate. However that arrangement assumes that the sensor is substantially uniform over its entire area. That is not always true.

Thus, in another arrangement, the image is subdivided into a plurality of parcels, each of which presents uniformity that is better than the uniformity of the image. By way of example, it is possible to select two parcels, one forming the center of the image and the other its periphery, such that the two parcels together coincide with the image.

The method of the invention is identical to that described above except that the processing that is applied above to the entire image is now applied successively to each of the parcels.

Returning to FIG. 7, the first step of the method of the invention is still a characterization step 700 for characterizing each individual pixel.

There follows the averaging step 701 for calculating the average spectral response in a parcel of each sub-image while considering the pertinent individual pixels.

The following step is the targeting step 702 for determining the ideal spectral response for each sub-image in the parcel under consideration.

The following step is an estimation step 703 for obtaining a tensor of 9×9 coefficients that is to come as close as possible to the ideal responses, when applied to the average spectral responses in the parcel under consideration. In the present example, this estimation is performed using the so-called generalized reduced gradient method.

Finally, in a correction step 704, the tensor is applied to the raw parcel in order to obtain the cross-talk corrected parcel.

Together, the corrected parcels produce the corrected image.

Two tensors suffice in this example in order to obtain better accuracy.

Naturally, the number of parcels may be increased in order to improve accuracy, but that is to the detriment of computation time.

The greatest accuracy is obtained when there are as many parcels as macropixels.

Under such circumstances, the averaging step 701 does not exist. Specifically, it should be observed that the average of only one value is equal to that value.

The method of the invention is identical to that described above, except that the processing that is applied above to all of the image or else to each parcel, is now applied to each individual pixel.

Returning to FIG. 7, the first step of the method of the invention is still a characterization step 700 for characterizing each individual pixel.

The averaging step 701 is omitted since it involves taking the average of a single value.

The following step is the targeting step 702 for determining the ideal spectral response of each individual pixel in the macropixel under consideration.

The following step is an estimation step 703 for obtaining a tensor of 9×9 coefficients that is to come as close as possible to the ideal responses, when applied to the individual pixels of the macropixel under consideration. In the present example, this estimate is performed using the so-called generalized reduce gradient method.

Finally, in a correction step 704, the tensor is applied to the raw macropixel in order to obtain the cross-talk corrected macropixel.

The corrected image is then obtained by re-assembling all of the corrected macropixels.

The implementations of the invention described above have been selected for their concrete nature. Nevertheless, it is not possible to list exhaustively all implementations covered by the invention. In particular, any means or any step described above may be replaced by equivalent means or an equivalent step without going beyond the ambit of the present invention.

The invention claimed is:

1. A method of limiting cross-talk in an imaging sensor, wherein the imaging sensor is in a form of a matrix of macropixels defining an image, each macropixel is formed by a matrix of individual pixels, each of which is dedicated to a distinct spectral band, all of the individual pixels dedicated to the same spectral band forming a sub-image, said image being topologically subdivided into at least one parcel, the method comprising the following steps:
   measuring the spectral response of each individual pixel forming the matrix of individual pixels;
   calculating the mean spectral response of each sub-image in a parcel;
   targeting to define an ideal spectral response of each sub-image in said parcel;
   estimating a series of coefficients for minimizing cross-talk in said parcel; and
   applying said coefficients to said macropixels in order to correct said sub-images in said parcel;
   wherein the imaging sensor comprises:
   a detector made by complementary metal oxide semiconductor (CMOS) technology on a silicon first substrate and comprising a matrix of pixels with compartments and a photosensitive zone at a center of each compartment;
   an array of microlenses focusing incident light on the photosensitive zones of the pixels, with a microlens above each of the compartments and having a diameter equal to a side of the compartment, and
   a filter module formed from a plurality of filters that are Fabry-Perot interference filters, each of the filters having a wavelength constant for a given filter but varying from one filter to another, the filters being made on a second substrate, the filter module bearing on the array of microlenses so that the filters are in register with the microlenses, and the filter module is fastened on the detector by a bead of adhesive; and wherein, in the targeting step to define the ideal response in each sub-image in said parcel, a Gaussian function is selected for each sub-image by specifying a center wavelength and a half-height width.

2. A method according to claim 1, wherein there are a plurality of parcels and each of said parcels comprises a plurality of contiguous macropixels.

3. A method according to claim 1, wherein there is a single parcel and the parcel coincides with said image.

4. A method according to claim 1, wherein said estimation step (703) comprises an optimization stage for producing said series of coefficients so as to minimize the difference between the responses of the sub-images corrected by these coefficients and the ideal responses of these sub-images.

5. A method according to claim 4, wherein said optimization stage makes use of the generalized reduced gradient method.

6. A method according to claim 1, wherein each individual pixel is processed with reference to the other individual pixels of the same macropixel.

7. A method according to claim 1, wherein each individual pixel is processed with reference to the other individual pixels that are its closest neighbors.

* * * * *